United States Patent
Gao et al.

(10) Patent No.: US 8,964,693 B2
(45) Date of Patent: Feb. 24, 2015

(54) METHOD FOR NOTIFYING THE CHANGE OF CELL INFORMATION

(75) Inventors: Yin Gao, Shenzhen (CN); Teng Fei, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 522 days.

(21) Appl. No.: 12/933,252

(22) PCT Filed: Jun. 12, 2008

(86) PCT No.: PCT/CN2008/071273
§ 371 (c)(1),
(2), (4) Date: Sep. 17, 2010

(87) PCT Pub. No.: WO2009/114971
PCT Pub. Date: Sep. 24, 2009

(65) Prior Publication Data
US 2011/0026493 A1 Feb. 3, 2011

(30) Foreign Application Priority Data
Mar. 17, 2008 (CN) .......................... 2008 1 0085087

(51) Int. Cl.
*H04W 24/02* (2009.01)
*H04W 36/00* (2009.01)
*H04W 92/20* (2009.01)

(52) U.S. Cl.
CPC ............. *H04W 24/02* (2013.01); *H04W 92/20* (2013.01)
USPC .......................................... 370/331; 455/436

(58) Field of Classification Search
None
See application file for complete search history.

(56) References Cited

U.S. PATENT DOCUMENTS

| 7,092,711 B2 | 8/2006 | Masuda et al. | |
|---|---|---|---|
| 2007/0087752 A1 | 4/2007 | Voyer et al. | |
| 2008/0167003 A1* | 7/2008 | Wang et al. | 455/411 |
| 2010/0248708 A1* | 9/2010 | Koivisto et al. | 455/419 |
| 2010/0278038 A1* | 11/2010 | Stahle et al. | 370/216 |
| 2010/0323662 A1* | 12/2010 | Dahlen et al. | 455/410 |

(Continued)

FOREIGN PATENT DOCUMENTS

| CN | 1435980 A | 8/2003 |
|---|---|---|
| CN | 1514670 A | 7/2004 |

(Continued)

OTHER PUBLICATIONS

European Patent Office, Extended European Search Report and Written Opinion for EP Application No. 08757684.9 (EP national stage application of PCT/CN2008/071273), dated Feb. 1, 2012.

(Continued)

*Primary Examiner* — Eunsook Choi
(74) *Attorney, Agent, or Firm* — Bright IP Law Offices

(57) ABSTRACT

The present invention disclose a method for notifying the change of cell information, which comprises: a first base station sends a serving cell change message to a second base station, wherein the serving cell change message carries one or more of the following information: cell adding information, cell deleting information, cell modifying information; in response to the serving cell change message, the second base station updates local information according to the information carried in the serving cell change message. With the present invention, the neighboring cell list may be updated in time, the management of the neighboring cell list performed by the base station is facilitated, and the switching strategy is optimized.

4 Claims, 2 Drawing Sheets

(56) References Cited

U.S. PATENT DOCUMENTS

2011/0117916 A1* 5/2011 Dahlen .................. 455/436
2012/0003961 A1* 1/2012 Wang et al. ............ 455/411

FOREIGN PATENT DOCUMENTS

| CN | 1859600 A | 11/2006 |
| CN | 101150864 A | 3/2008 |

OTHER PUBLICATIONS

Ericsson: "X2 Setup Procedure", XP050162950, 3GPP Draft; R3-072163, 3rd Generation Partnership Project (3GPP), Mobile Competence Centre; 650, Route des Lucioles; F-06921 Sophia-Antipolis Cedex; France, vol. RAN WG3, no. Jeju Island; Oct. 31, 2007.

* cited by examiner

METHOD FOR NOTIFYING THE CHANGE OF CELL INFORMATION

CROSS REFERENCE TO RELATED APPLICATIONS

This application is the National Stage of International Application No. PCT/CN2008/071273, filed Jun. 12, 2008, which claims priority to Chinese Patent Application No. 200810085087.1 filed on Mar. 17, 2008. The above applications are incorporated herein by reference.

FIELD OF THE INVENTION

The present invention relates to communication field, in particular to a method for notifying the change of cell information based on a Long-Term Evolution (LTE) system.

BACKGROUND OF THE INVENTION

An LTE network has a flat network structure and is comprised of an E-UTRAN (Evolved UMTS Terrestrial Radio Access Network), an eNB (Evolved NodeB), and an EPC (Evolved Packet Core).

Wherein the E-UTRAN comprises a set of eNBs connected to the EPC via an S1 interface, and the eNBs are connected to each other via X2 interfaces. Both S1 and X2 are logic interfaces. One EPC may manage one or more eNBs, and one eNB may also be controlled by a plurality of EPCs, meanwhile one eNB may manage one or more cells.

SON (Self Organized Network) is a technology for automatically configuring and optimizing a network, the characters of this technology are self configuration and self optimization. The technology is used in the LTE to enable an LTE base station (eNB) to automatically configure network parameters according to a certain measurement, and perform automatic optimization according to the network change so as to guarantee an optimal network performance and save a lot of man power and resources.

In the LTE system, if a change occurs to a serving cell or the neighboring cell list of the serving cell, a certain measure may be used to achieve an optimal situation for the network coverage and capacity. However, there is no such an optimizing scheme yet.

SUMMARY OF THE INVENTION

The present invention is proposed in consideration with the problem existed in the related art that a solution for optimizing the network coverage and capacity is needed in the situation that a change occurs to the serving cell of the present base station. To this end, the present invention aims at providing a method for notifying the change of cell information, which is used to notify the change information to other base stations when the serving cell changes, so as to solve the above problem existed in the related art.

In order to realize the above object, a method for notifying the change of cell information is provided according to the present invention.

The method for notifying the change of cell information according to the embodiments of the present invention comprises: a first base station sends a serving cell change message to a second base station, wherein the serving cell change message carries one or more of the following information: cell adding information, cell deleting information, cell modifying information; in response to the serving cell change message, the second base station updates local information according to the information carried in the serving cell change message.

Preferably, the cell adding information is a newly-added serving cell list and comprises information of a number of newly-added serving cells and related information of the newly-added serving cells, the related information of the newly-added serving cells comprises: a cell identifier, a switching-related parameter.

Further, when the first base station detects one or more newly-established serving cells under the first base station, the first base station sends the cell change message which carries the cell adding information to the second base station after the one or more newly-established serving cells work normally; and the second base station updates local information, for example, the second base station adds the one or more serving cells indicated by the cell adding information in the neighboring cell list related to the service cell according to a predetermined neighboring cell adding determination strategy.

Preferably, the cell deleting information is a list of deleted serving cells, which comprises information of a number of the deleted serving cells and related information of the deleted serving cells, the related information of the deleted serving cells comprises a cell identifier.

Further, when the first base station detects there is one or more deleted serving cells under the first base station, the first base station sends the cell change message which carries the cell deleting information to the second base station after the resource of the one or more deleted serving cells is removed; and the second base station updates local information according to the cell deleting information, for example, the second base station determines the neighboring cell list related to the serving cell, and deletes the one or more serving cells indicated by the cell deleting information from the neighboring cell list related to the serving cell.

Preferably, the cell modifying information is a list of modified serving cells and comprises information of a number of the modified serving cells and related information of the modified serving cells, and the related information of the modified serving cells comprises: a cell identifier, a switching-related parameter.

Further, when the first base station detects there is a modification to a switching-related parameter or a key parameter of one or more serving cells, the first base station sends the cell change message which carries the cell modifying information to the second base station after the one or more modified serving cells work normally; and the second base station updates local information according to the cell modifying information, for example, the second base station determines the neighboring cell list related to the serving cell, and updates information of the one or more serving cells indicated by the cell modifying information in the neighboring cell list related to the serving cell.

Preferably, the first base station sends the serving cell change message via the X2 interface.

Preferably, the neighboring cell list related to the serving cell is a neighboring cell list comprising the serving cell.

Preferably, the above cell identifier is an identifier which is able to uniquely identify the cell in a predefined range, in LTE, the above predefined range may be unique in the whole network or in a specified geographic area. That is to say, the cell identifier may be a cell global identifier or a cell physical address identifier.

Preferably, the above switching-related parameter comprises a cell physical address, a tracking area code, a public land mobile network identifier, a cell frequency and the neighboring cell list corresponding to the serving cell.

With the above technology scheme provided by the present invention, the situation of the cell change is notified through the serving cell change message, an automatic optimization of the neighboring cell may be realized, so that the resource consumption of the network air interface and the power consumption of the UEs (User Equipment) may be reduced, and the mobile performance of the users may be guaranteed.

Other features and advantages of the present invention will be described in the following specification, and partly apparent therefrom, or understood by implementing the present invention. The objects and other advantages of the present invention will be realized and obtained through the structures specially defined in the specification, claims and drawings.

BRIEF DESCRIPTION OF THE DRAWINGS

The drawings provide a further understanding of the present invention and form a part of the specification. The drawings are used to explain the present invention together with the embodiments of the present invention without unduly limiting the scope of the present invention, wherein.

DETAILED DESCRIPTION OF THE EMBODIMENTS

It can be seen from the above description that in the situation that a change occurs to a parameter of the serving cell of the present base station, if a neighboring base station can be notified to update the neighboring cell list related to the serving cell, the switching strategy may be undoubtedly optimized.

In view of this, a method for notifying the change of cell information is provided by the embodiment of the present invention, for example, when the cell of a certain base station is added, modified or deleted, a change will occur to a neighboring cell of a base station which is adjacent to the certain base station. The automatic update of related cell information may be realized through the present invention.

Figure 1:
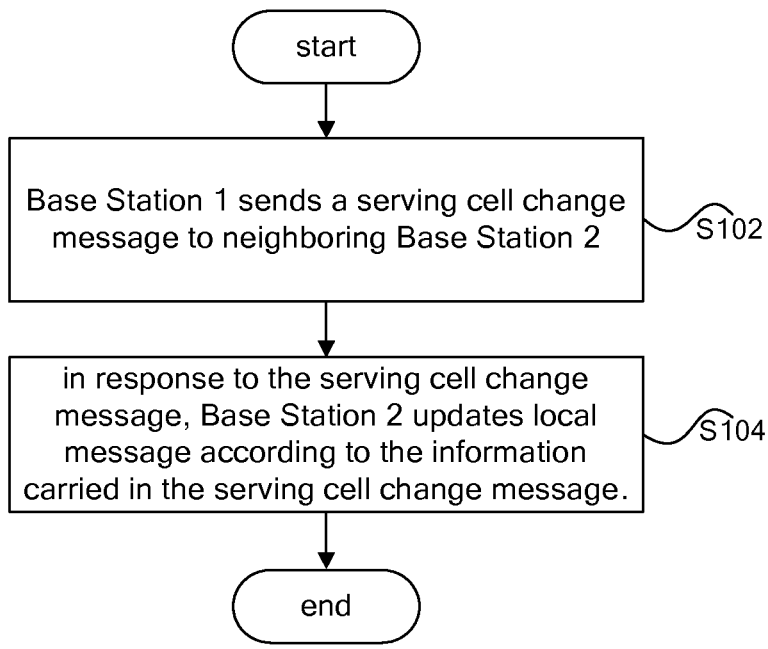
FIG. 1 is the flow chart of the method for notifying the change of cell information according to the embodiment of the present invention.

FIG. 1 is the flow chart of the method for notifying the change of the cell information according to the embodiment of the present invention. As shown in FIG. 1, according to the embodiment of the present invention, in the LTE system, the process for realizing the procedure of notifying the change of the serving cell between the neighboring base stations (for example, the base stations which have an X2 connection or have an opposite end relationship, the opposite end relationship refers to that the local neighboring cell list of any base station thereof comprises the serving cell of the opposite base station) comprises:

Step S102, Base Station 1 sends a serving cell change message to neighboring Base Station 2 (for example, may via the X2 interface), wherein the serving cell change message carries one or more of the following information: cell adding information, cell deleting information, cell modifying information;

Step S104, in response to the serving cell change message, Base Station 2 updates local message according to the information carried in the serving cell change message.

First, in Step S102, in the practical application, in order to reduce the load of air interface, the cell adding information in the cell change message (a newly-added serving cell list), the cell deleting information (a deleted serving cell list), the cell modifying information (a modified serving cell list) may be optional information elements, as shown in Table 1; or may be present by compulsory information elements, as shown in Table 2, which is not limited in the present invention.

TABLE 1

| information element name | Presence situation | IE type and reference information |
|---|---|---|
| Base station global identifier | M (Mandatory) | |
| –>newly-added serving cell list | | If there is no newly-added serving cell currently, the following information of the list will not be filled. |
| –>>the number of the newly-added serving cells | O (Optional) | The number is from 1 to the maximum number of the serving cells |
| –>>the information of the newly-added serving cells | O | The information of the newly-added serving cells, comprising the information such as cell identifiers, switching-related parameters. |
| –>deleted serving cell list | | If there is no deleted serving cell currently, the following information of the list will not be filled. |
| –>>the number of the deleted serving cells | O | The number is from 1 to the maximum number of the serving cells |
| –>>the information of the deleted serving cells | O | The information of the deleted serving cells, comprising cell identifiers |
| –>modified serving cell list | | If there is no modified serving cell currently, the following information of the list will not be filled. |
| –>>the number of the modified serving cells | O | The number is from 1 to the maximum number of the serving cells |
| –>>the information of the modified serving cells | O | The information of the modified serving cells, comprising the information such as cell identifiers, switching-related parameters. |

TABLE 2

| information element name | Presence situation | IE type and reference information |
|---|---|---|
| Base station global identifier | M | |
| –>newly-added serving cell list | | |
| –>the number of the newly-added serving cells | M | If there is no newly-added serving cell currently, the number will be 0. |
| –>>the information of the newly-added serving cells | M | The information of the newly-added serving cells, comprising the information such as cell identifiers, switching-related parameters. |
| –>deleted serving cell list | | |

TABLE 2-continued

| information element name | Presence situation | IE type and reference information |
|---|---|---|
| –>>the number of the deleted serving cells | M | If there is no deleted serving cell currently, the number will be 0. |
| –>>the information of the deleted serving cells | M | The information of the deleted serving cells, comprising cell identifiers |
| –>modified serving cell list | | |
| –>>the number of the modified serving cells | M | If there is no modified serving cell currently, the number will be 0. |
| –>>the information of the modified serving cells | M | The information of the modified serving cells, comprising the information such as cell identifiers, switching-related parameters. |

In particular, as shown in Table 1 and Table 2, the newly-added cell list comprises the information of the number of the newly-added serving cells and the related information of the newly-added serving cells, wherein the related information of the newly-added serving cells comprises: cell identifiers, switching-related parameters; the deleted serving cell list comprises the information of the number of the deleted serving cells and the related information of the deleted serving cells, wherein the related information of the deleted serving cells comprises: cell identifiers; the modified serving cell list comprises the information of the number of the modified serving cells and the related information of the modified serving cells, wherein the related information of the modified serving cells comprises: cell identifiers, switching-related parameters; and the switching-related parameters comprise a cell physical address, a tracking area code, a public land mobile network identifier, a cell frequency, the neighboring cell list information corresponding to the serving cell. Herein, the cell identifier is an identifier which is able to uniquely identify the cell in a predefined range (may be unique in the whole network, or may be unique in a specified geographic area), the cell identifier may be a cell global identifier in an LTE system, or may be a cell physical address identifier, preferably, in the present invention, the above cell identifier is a global cell identifier.

When the above information is the optional information elements shown in Table 1, and when a change occurs to the serving cell of the base station, only the changed serving cell is filled into a suitable serving cell list. If the current base station has only newly-added serving cells (one or more), there is only the newly-added serving cell list information in the serving cell change message; if the current base station has both the newly-added serving cells (one or more) and deleted serving cells (one or more), there are the newly-added serving cell list information and the deleted serving cell list information in the serving cell change message.

In addition, in step S104, Base Station 2 performs different operation according to the different information elements carried by the serving cell change message, for example, for the situation of cells being added, Base Station 2 adds the added cell information in the serving cell change notification to a related neighboring cell list according to a predetermined neighboring cell adding determination strategy and the information carried in the serving cell change information; or for the situation of cells being deleted, Base Station 2 deletes the information of the deleted cells from the related neighboring cell list; or for the situation of cells being modified, Base Station 2 updates the information of the modified cells to the related neighboring cell list. Based on this, the technology scheme of the embodiments of the present invention will be further described hereinafter by means of embodiments.

Embodiment 1: newly-adding a serving cell

Figure 2:
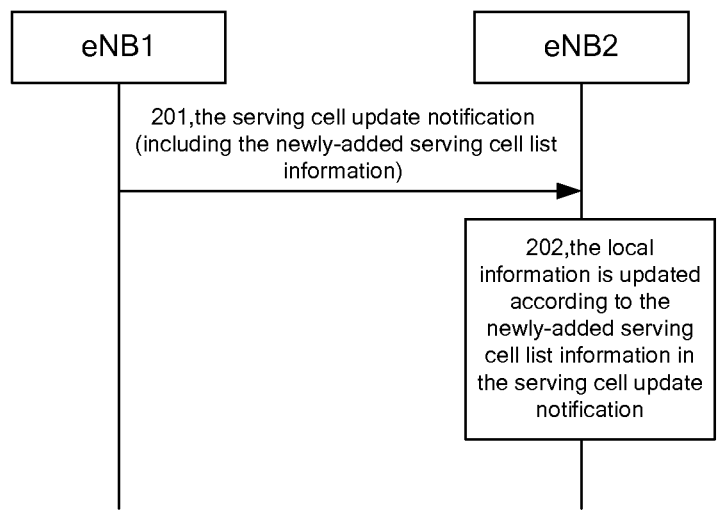
FIG. 2 is the schematic diagram of Embodiment 1 of the method shown in FIG. 1.

As shown in FIG. 2, the method comprises the following processes:

201, Base Station 1 finds one or several newly-established serving cells under Base Station 1, it sends a serving cell change message which comprises newly-added serving cell list information to neighboring Base Station 2 via X2 interface message after the newly-added serving cells work normally, wherein the newly-added serving cells may be one or several cells.

202, in response to the serving cell change message, and according to a certain neighboring cell adding determination strategy, Base Station 2 adds the newly-added cell indicated in the serving cell change message to the neighboring cell list of the local related serving cell.

By the above processing, when Base Station 1 newly adds a serving cell, the update of the related neighboring cell list is realized at Base Station 2.

Embodiment 2: deleting a serving cell

Figure 3:
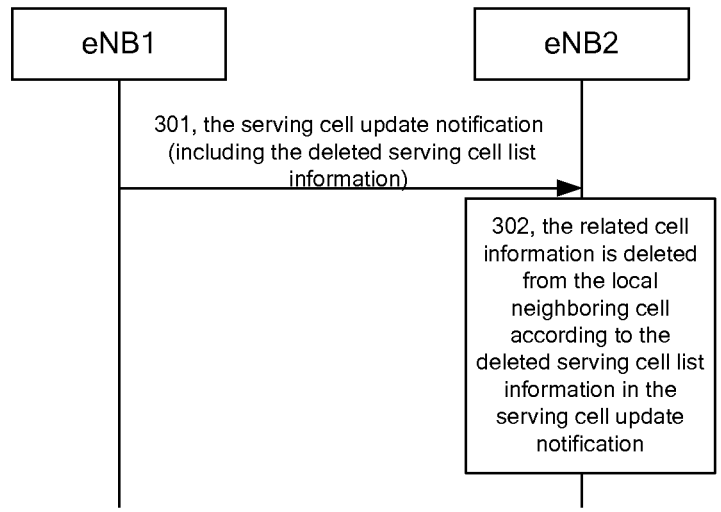
FIG. 3 is the schematic diagram of Embodiment 2 of the method shown in FIG. 1.

As shown in FIG. 3, the method comprises the following processes:

301, Base Station 1 finds one or several deleted serving cells under Base Station 1, it sends a serving cell change message which comprises deleted serving cell list information to neighboring Base Station 2 via X2 interface message after the resource of the deleted serving cell is removed, wherein the deleted serving cells may be one or several cells.

302, in response to the serving cell change message, Base Station 2 determines the list of the neighboring cells related to the serving cell, looks for the deleted serving cells indicated by the serving cell change message in the neighboring cell list, and then deletes the information of the corresponding cells.

By the above processing, when Base Station 1 deletes a serving cell, the update of the related neighboring cell list is realized at Base Station 2.

Embodiment 3: modifying a serving cell

Figure 4:
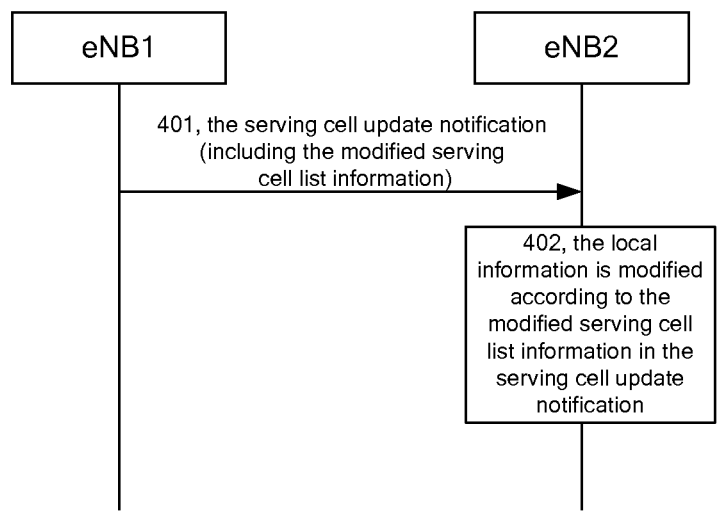
FIG. 4 is the schematic diagram of Embodiment 3 of the method shown in FIG. 1.

As shown in FIG. 4, the method comprises the following processes:

401, Base Station 1 finds that there is a modification to a switching-related parameter or a key parameter of one or several serving cells under Base Station 1, Base Station 1 sends a serving cell change message which comprises modified serving cell list information to Base Station 2 via the X2 interface message after the modified serving cells work normally;

402, in response to the serving cell change message, Base Station 2 determines the list of the neighboring cells related to the serving cell according to cell update information, and looks for the modified serving cells indicated by the serving cell change message in the neighboring cell list, and then modifies the information of the corresponding cells in the neighboring cell list.

By the above processing, when Base Station 1 modifies a serving cell, the update of the related neighboring cell list is realized at Base Station 2.

As described above, with the above technical scheme of the present invention, by providing a method for notifying the change of cell information, the neighboring cell list may be updated in time, the management of the neighboring cell list performed by the base station may be facilitated, and the switching strategy may be optimized, and the technical scheme of the present invention is helpful in realizing the automatic optimization strategy of the network coverage and capacity, and presents the integrality of neighboring cell automatic optimization scheme.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for notifying change of cell information, which is used for a first base station to send a second base station cell change information, wherein an X2 interface exists between the first base station and the second station, the method comprising:

the first base station detecting a modification to a switching-related parameter or a key parameter of one or more serving cells under the first base station, wherein the one or more serving cells remain under the first base station both before and after the modification;

the first base station sending a serving cell change message to the second base station, wherein the serving cell change message carries cell modifying information of the one or more serving cells under the first base station, wherein the cell modifying information is a list of the one or more modified serving cells and comprises information of the modified serving cells and related information of the modified serving cells, and the related information of the modified serving cells comprises a cell identifier and a switching-related parameter, wherein the switching-related parameter comprises one of a cell physical address, a tracking area code, a public land mobile network identifier, a cell frequency, and a neighboring cell list information corresponding to at least one of the modified serving cells; and in response to the serving cell change message, the second base station updating local information according to information carried in the serving cell change message.

2. The method according to claim 1, wherein the first base station sends the serving cell change message via the X2 interface.

3. The method according to claim 1, wherein the operation that when the first base station detects that its serving cell changed, the first base station sends a serving cell change message to the second base station is in particular: when the first base station detects there is a modification to a switching-related parameter or a key parameter of one or more serving cells, the first base station sends the cell change message which carries the cell modifying information to the second base station after the one or more modified serving cells work normally;

the operation of updating the neighboring cell list related to the serving cell is in particular: the second base station determines the neighboring cell list related to the serving cell according to the cell modifying information, and updates information of the one or more serving cells indicated by the cell modifying information in the neighboring cell list related to the serving cell.

4. The method according to claim 1, wherein the cell identifier is an identifier which is able to uniquely identify the cell in a predefined range, the predefined range is unique in the whole network or in a specified geographic area.

* * * * *